United States Patent [19]

Howe et al.

[11] 3,751,258

[45] Aug. 7, 1973

[54] AUTOSTEREOGRAPHIC PRINT ELEMENT

[75] Inventors: Donald J. Howe; John C. Hoppe, both of Spencerport, N.Y.

[73] Assignee: Eastman Kodak Company, Rochester, N.Y.

[22] Filed: Oct. 29, 1970

[21] Appl. No.: 85,214

[52] U.S. Cl. ................................. 96/81, 96/40
[51] Int. Cl. ............................................. G03c 1/84
[58] Field of Search ...................... 96/40, 81, 85; 350/167

[56] References Cited
UNITED STATES PATENTS

| | | | |
|---|---|---|---|
| 3,649,283 | 3/1972 | Christensen et al. | 96/85 |
| 2,726,154 | 12/1955 | Land | 96/81 |
| 3,595,652 | 7/1971 | Farney | 96/76 |
| 1,918,705 | 7/1933 | Ives | 96/81 |
| 2,140,702 | 12/1938 | Kanolt | 96/40 |
| 2,500,511 | 3/1950 | Bonnet | 96/40 |

Primary Examiner—Norman G. Torchin
Assistant Examiner—Edward C. Kimlin
Attorney—W. H. J. Kline, B. D. Wiese and H. E. Byers

[57] ABSTRACT

Autostereographic prints are made by photographic means in which a transparent support having one surface lenticulated carries on the opposite surface at least one radiation-sensitive layer such as a silver halide emulsion layer over which the sensitive layer farthest from the support is coated a highly reflective layer such as one containing titanium dioxide pigment, which is preferably permeable to the processing baths required to process the radiation-sensitive layer.

10 Claims, 1 Drawing Figure

PATENTED AUG 7 1973　　　　　　　　3,751,258
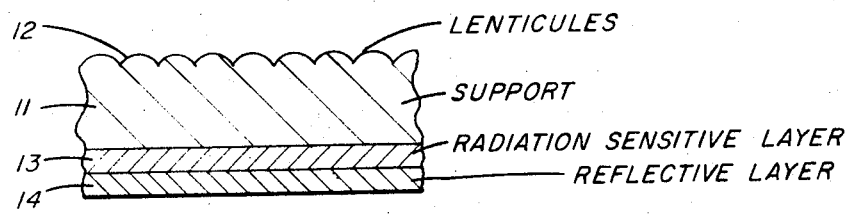
DONALD J. HOWE
JOHN C. HOPPE
INVENTORS
BY *Henry E. Byers*
ATTORNEY

AUTOSTEREOGRAPHIC PRINT ELEMENT

BACKGROUND OF THE INVENTION

This invention concerns autosterographic photographic prints, in particular a radiation-sensitive element comprising a lenticulated surface to produce prints which appear to be in three dimensions.

It has been proposed to make autosterographic prints by photographic means of parallax sterograms, parallax panoramagrams, and the like. For example, reference is made to Kingslake, "Applied Optics and Optical Engineering," Volume II, pp. 108–116, Academic Press, New York, 1965.

Previous workers in the field have proposed the use of a transparent lenticular screen in combination with a photographic element to achieve the desired autostereogram. Autostereograms for viewing by reflected light were proposed in which the reflecting material is applied after processing to the surface of the photographic image opposite the lenticulated surface by a variety of techniques; for example, see U.S. Pats. Nos. 1,918,705 and 2,500,511 and British Pat. No. 492,186.

When reflection prints are made by ordinary photographic processes, however, the pro belm remains that the reflective layer beneath the photosensitive layer must be applied or laminated or otherwise put in place after the photographic processing steps are complete since the reflective layers used are impermeakle to the processing baths. If the alternative approach is used of attaching or affixing in rigid relationship to the picture element, the lenticular-bearing element, after the processing has been completed, then a severe alignment problem is encountered in assuring the required precise registration of the lenticules with the picture elements. In addition, any dimensional changes in the picture element or the lenticulated element relative to each other, occurring between exposure of the print and final juxtaposition of the picture element and the lenticulated element, will degrade or perhaps destroy the intended stereoscopic effect.

It is an object of this invention to provide novel autostereographic reflection print elements.

It is another object of this invention to provide an improved process for preparing autostereographic reflection prints.

It is a further object of this invention to provide an autostereographic reflection print by a process which avoids the problems associated with alignement of lenticules with stereographic information.

A further object is to provide autostereographic prints bp a process which results directly in useful prints without need for an additional step of applying a reflective layer after photographic processing steps.

Further advantages will be apparent from the description and examples which follow.

SUMMARY OF THE INVENTION

The autostereographic reflection print element of this invention comprises a transparent support having on one surface a multiplicity of lenticules and haviing on the opposite surface at least one radiation-sensitive layer and a reflective layer over the radiation-sensitive layer farthest from the support.

In a preferred embodiment, a transparent support comprises cellulose triacetate film support which has been lenticulated by embossing so that there are 200 lenticules per inch. On the other side of the film support is a layer of light snesitive silver halide emulsion such as a silver chlorobromide elulsion. Over the emulsion layer is a reflective coating comprising gelatin and a titanium dioxide pigment.

In one process of forming an autostereographic reflection print using the element of the invention, a multiple lens camera is employed to expose a light-sensitive negative element to form a multiplicity of images bearing a stereoscopic relationship to one another. The stereographic images are then exposed on the element of this invention. The exposed element is processed by conventional processing means and the resulting reflection autostereogram viewed directly without special viewing aids giving a panoramic stereoscopic image over an appreciable viewing angle.

BRIEF DESCRIPTION OF THE DRAWING

The autostereographic reflection print element that is the subject of this invention is described with particular reference to the preferred embodiments thereof. A greatly enlarged cross section is shown in FIG. 1 of one possible configuration of an integral autostereographic reflection print element. The transparent support layer 11 of suitable material to be described hereinafter has lenticules 12 embossed or otherwise suitably formed on one surface. On the opposite smooth surface of the support layer is coated a radiation-sensitive element 13, which can be either a photographic color or black-and-white element of one or more layers, and over the radiation-sensitive element is coated a reflective layer 14, as hereinafter described, that is permeable to the baths or other means required to process to a visible image an exposure on the radiaition-sensitive element 13.

DESCRIPTION OF PREFERRED EMBODIMENTS

Support materials suitable in the practice of this invention include those polymeric materials that lend themselves to the formation of lenticules by heat embossing, solvent softening followed by embossing, or a combination of the two; pressure embossing; hot melt coating followed by embossing as described in U.S. Pat. No. 3,110,608 issued Nov. 12, 1963 to Brunson et. al.; and other techniques for the formation of lenticules. Such polymeric materials as cellulose esters; e.g., cellulose acetate, cellulose triacetate, cellulose butyrate, etc.; polystyrene, etc., may be used.

A polymeric support may be formed by laminating in order to provide a surface which is subject to forming lenticules thereon. For instance, a polyester transparent support could be employed over which a cellulose ester or polyolefin layer has been laminated or coated which is particularly suitable for forming lenticules by a suitakle heat process. It will be appreciated that among the polymeric materials which can be used are, for example, polyolefins, particularly the polyolefins formed from olefins having 2 to 10 carbon atoms, theri copolymers and homopolymers.

The polymeric surface can be given a treatment to improve the adhesion to the radiation-sensitive material or the like. Typical treatments which are particularly suitable for use with hydrophobic polymers such as polyolefins, include treatments with a flame, use of a oxidizing agent such as nitric acid, sodium hypochlorite, chlorine, hydrogen peroxide, sulfuric acid and potassium chromate, etc., electron bombardment, radiation by ultraviolet light, etc.

Electron bombardment of polymeric surfaces is conveniently carried out b means of a corona discharge. Variations in electrical conditions may be used with respect to frequency, voltage, number of electrodes, spacing between the discharge gap, medium used in the discharge gap, such as an inert gas, ozone, etc. Apparatus disclosed in Rothacker Patents U.S. Pat. Nos. 2,864,755 and 2,864,756 can be utilized. The level of electron bombardment or similar surface treatment of the polymeric surface can be measured by the contact angle obtained when a drop of distilled water is placed on a level sample of the polymeric coating. By projecting the image of the drop and sample on a suitable screen, and measuring the angle of a line tangent to the drop image at the point the drop touches the polymeric sample, a contact angle is obtained which can be measured and utilized to determine the degree of hydrophilicity. Generally untreated polyethylene coated paper gives a contact angle of about 90°. A contact angle of preferably from about 40° to about 75° improves the adhesion of hydrophilic coatings and is highly desirable for coatings such as cellulose ester coatings, subbing coatings or the like. With polypropylene, the preferred contact angle is preferably less than 54° for subsequent coatings.

Typical methods of treating polyethylene by electron bombardment are disclosed in Traver U.S. Pat. Nob. 3,018,189 directed to methods for treating the surface of polyethylene with electrostatic discharges to change the surface properties of the polyethylene with respect to adhesion of materials coated thereon. British Pat. Specification No. 715,915 issued to the Visking Corp., published Sept. 22, 1954 also discloses a method and apparatus for treating plastic structures with a corona discharge.

Another method of improving the adhesion to a polymer coated surface is illustrated by Alsup U.S. Pat. No. 3,161,519 issued Dec. 15, 1964 in which colloidal silica is employed in a coating over a polyolefin surface. In the particular disclosure therein, a coating mixture containing colloidal silica is coated on untreated polyethylene coated paper and dried with hot air at about 150°F.

The lenticules can be any shape which will focus an image in the plane of the light snesitive layer, for example, semi-cylindrical, semi-ellipsoidal, parabolic, etc., in cross section. The lenticular frequency, i.e., number of lenticules per inch, can be from about 50 to 500 per inch, and the preferred frequency is from about 100 to 300 per inch. The required support thickness is a function of the curvature of the lenticules and the index of refraction of the support material, as is well known to those skilled in the art.

Radiation-sensitive coatings can include diazo coatings, silver salt coatings, such as silver halide, silver dye salts, etc.

Radiation-sensitive silver halide emulsions suitable for use with this invention can be coarse or fine grain and can be prepared by any of the well-known procedures; e.g., single-jet emulsions, double-jet emulsions, such as Lippmann emulsions, ammoniacal emulsions, thiocyanate or thioether ripened emulsions such as those described in Nietz et al U.S. Pat. No. 2,222,264; Illingsworth U.S. Pat. No. 3,320,069; and Mcbride U.S. Pat. No. 3,271,157. Surface image emulsions may be used or internal image emulsions such as those described in No. Davey et al. U.S. Pat. No. 2,592,250; Porter et al. U.S. Pat. No. 3,206,313; Berriman U.S. Pat. No. 3,367,778 and Bacon et al. U.S. Pat. No. 3,447,927.

If desired, mixtures of surface and internal image emulsions may be used as described in Luckey et al U.S. Pat. No. 2,996,382. Negative type emulsions may be used or direct-positive emulsions such as those described in Leermakers U.S. Pat. No. 2,184,013; Kendall et al. U.S. Pat. No. 2,541,472; Berriman U.S. Pat. No. 3,367,778; Schouwenaars British Pat. No. 723,019; Illingsworth et al. French Pat. No. 1,520,821; Ives U.S. Pat. No. 2,563,785; Knott et al. U.S. Pat. 2,456,953 and Land U.S. Pat. 2,861,885. Knott et al. U.S. Pat. No. 2,456,953 and Land U.S. Pat. No. 2,861,885. The emulsions may be regular grain emulsions such as the type describe d in Klein and Moisar, *J. Phot. Sci.*, Vol. 12, No. 5, September/October, 1964, pp. 242-251.

Silver halide developing agents used for initiating development of the exposed sensitive element can be conventional types used for developing films or papers. Usually, the concentration of developing agent and/or developing agent precursor employed is about 3 to about 320 mg/ft$^2$ of support.

Developing agents and/or developing agent precursors can be employed alone or in combination with each other, as well as with auxiliary developing agents. Suitable silver halide developing agents and developing agent precursors which can be employed include, for example, polyhydroxybenzes, alkyl substituted hydroquinones, as exemplified by *t*-butyl hydroquinone, methyl hydroquinone and 2, 5-dimethylhydroquinone, catechol and pyrogallol; chloro substituted hydroquinones such as chlorohydroquinones such as methoxy hydroquinone or ethoxy hydroquinone; aminophenol developing agents such as 2,4-diaminophenols and methylaminophenols.

The photographic emulsions employed can also be *x*-ray or other non-spectrally sensitized emulsions or they can contain spectral sensitizing dyes such as described in U.S. Pats. Nos. 2,526,632 of Brooker et al. Issued Oct. 24, 1950 and 2,503,776 of Sprague issued Apr. 11, 1950. Spectral sensitizers which can be used include cyanines, merocyanines, styryls and hemicyanines.

The photographic emulsions can contain various photographic addenda, particularly those known to be beneficial in photographic compositions. Various addenda and concentrations to be employed can be determined by those skilled in the art. Suitable photographic addenda include hardeners, e.g., those set forth in British Pat. No. 974,317; buffers which maintain the desired developing activity and/or pH level; coating aids; plasticizers, speed increasing addenda, such as amines, quaternary ammonium salts, sulfonium salts and alkylene oxide polymers; and various stabilizing agents, such as sodium sulfite. The photographic silver salt emulsions can be chemically sensitized with compounds of the sulfur group such as sulfur, selenium and tellurium sensitizers, noble metal salts such as gold, or reduction sensitized with reducing agents or combinations of such materials.

Various photographic silver salts can be used in the practice of the invention. These include photographic silver halides such as silver iodide, silver bromide, silver chloride, as well as mixed halides such as silver bromoiodide, silver chloroiodide, silver chlorobromide and silver bromochloroiodide. Photographic silver salts which are not silver halides can also be employed such as silver salts of certain organic acids silverdye salts or complexes, etc.

The photographic silver salts are typically contained in an emulsion layer comprising any binding materials suitakle for photographic purposes. These include natural and synthetic binding materials generally employed for this purpose, for example, gelatin, colloidal albumin, water-soluble vinyl polymerws, mono and polysaccharides, cellulose derivatives, proteins, water-soluble polyacrylamides, polyvinyl pyrrolidone and the like, as well as mixtures of such binding agents. The elements can also contain releasing layers and/or antistatic layers (i.e., crnducting layers).

This invention may be used with emulsions designed for color photography; for example, emulsions containing colorforming couplers such as those described in Frohlich et al U.S. Pat No. 2,376,679, Jelley et al. U.S. Pat. No. 2,322,027, Fierke et al. U.S. Pat. No. 2,801,171, Godowsky U.S. Pat. No. 2,698,794, Barr et al. U.S. Pat. No. 3,227,554 and Graham et al. U.S. Pat. No. 3,046,129; or emulsions to be developed in solutions containing color-forming couplers such as those described in Mannes et al. U.S. Pat. No. 2,252,718, Carroll et. al. U.S. Pat. No. 2,592,243 and Schwann et al. U.S. Pat. No. 2,950,970; and in false-sensitized color materials such as those described in Hanson U.S. Pat. No. 3,763,549.

A particularly useful multilayer color emulsion for use in this invention is described in Crawford et al. U.S. application Ser. No. 447,373 filed Apr. 12, 1965.

Preferakly the reflective layer is permeable to processing solutions for processing the exposed radiation-sensitive layer or layers. Particularly useful reflective layers are permeable to aqueous alkaline solutions, for example, alkaline solutions usedto develop silver halide emulsions.

Reflective layers permeable to processing baths can be composed of hydrophilic colloids including both naturally occurring substances such as proteins; for example, gelatin, gelatin derivatives, cellulose derivatives, polysaccharides such as dextran, gum arabic and the like; and synthetic polymeric substances such as water-soluble polyvinyl compounds, for example, polyvinyl alcohol and its derivatives, poly(vinylpyrrolidone), acrylamide polymers and the like, colloidal albumin, cellulose esters, etc. A useful coverage of colloids is between 0.1–2.5 grams/ft$^2$. To impart the required reflectivity to the reflective layers, light-colored, preferably white, pigments such as titanium dioxide, zinc oxide, barium sulfate, etc.; are incorporated in the layer.

An especially preferred pigment is titanium dioxide (rutile form) consisting of particles having an average diameter of 0.1 to 1.0 microns and prefera bly 0.2 to 0.3 microns. A useful range of pigment is between 1.0 910.0 grams/ft$^2$.

Alternatively, the reflective layer can be one wherein the reflectivity is the result of voids, as in vesicular material, or reflectivity can be introduced by means of crystallization or by blushing of the layer by a non-solvent.

The composite autostereographic reflection print material is made by coating the photosensitive layer or layers on the smooth surface of the lenticular support using suitable coating techniques such as those familiar to those skilled in the art. Laminating may also be used. The reflecting layer is coated over the photosensitive layer or layers using suitakle techniques.

The various layers, including the photographic layers, employed in the practice of this invention can contain light absoring materials and filter dyes such as those described in Sawdey U.S. Pat. No. 3,253,921; Gaspar U.S. Pat. No. 2,274,782; Silberstein et al. U.S. Pat. No. 2,527,583 and Van Campen U.S. Pat. No. 2,956,879. If desired, the dyes can be mordanted; for example, as described in Jones et al. U.S. Pat. No. 3,282,699.

The autostereographic reflection print material that is the subject of this invention can be used to make autostereographic reflection prints; e.g., parallax stereograms, parallax panoramagrams, panoramic paradlax stereograms, etc., by techniques well known to those skilled in the art, such as the techniques descri bed in Kingslake, op cit. A particularly preferred method involves the making of a series of negatives in a single-shot, multiple lens camera such as that described in Kingslake, op cit. The resulting negatives were printed on the photographic element of this invention using, for example, a step-and-repeat printer to form a multiplicity of image elements behind each of the lenticules. The exposed print is processed by conventional techniques; and the resulting reflection autostereogram can be viewed directly without special viewing aids, giving a panoramic stereoscopic image over an appreciable viewing angle.

The following examples are included for a further understanding of the invention.

EXAMPLE 1

An autostereographic reflection print element is prepared as follows:

A subbed cellulose acetate support about 0.010 inch thick whose unsubbed surface is embossed to form cylindrical lenticules approximately 0.003 inch in radius (i.e., about 200 per inch) has coated on its subbed surface a series of layers in the following order:

1. Gelatin containing a UV absorber
2. A green-sensitive silver chlorobromide gelatin emulsinon containing a magenta dye-forming coupler pl 3. A gelatin interlayer
4. A red-sensitive silver chlorobromide gelatin emulsinon containing a cyan dye-forming coupler
5. A gelatin interlayer
6. A blue-sensitive silver chlorobromide gelatin emulsion containing a yellow dye-forming coupler
7. A gelatin interlayer
8. A layer containing gelatin at a coverage of 0.5 gram/ft$^2$ and titanium dioxide (rutile form) at a coverage of 3.0 grams/ft$^2$
9. A gelatin overcoat.

Using the element just described, an autostereographic photographic print is prepared as follows. A subject is photographed using a conventional color negative film by means of a special eight-lens camera designed to make eight simultaneous exposures in focus alignment and stereographic relationship with one another and linearly disposed along the film. The negative film is processed and the resulting array of color negatives is printed onto the light-sensitive autostereographic print element hereinbefore described using a printer which exposes the eight separate negative images. The exposures are made such that the images recorded by the multicolor print emulsions behind the lenticules bear the crrrect stereographic relationship to one another. The exposed print is processed according to a conventional color process, as for example, that which is given in Example 1 of U.S. Pat. No. 2,956,879. The presence of the $TiO_2$ containing reflective layer causes no difficulties in processing.

WHen the print is viewed by reflected light from the lenticular side, an excellent stereoscopic effect is observed. Similar results are obtained with other reflective layers, including barium sulfate, zinc oxide, and blushed cellulose acetate.

Example 2

An autostereographic print is prepared as in Example 1, except that a multilayer color structure suitable for reversal processing is used in the print element, and a conventional color reversal film is used to photograph the subject. After conventional reversal processing of the camera exposed film, the print exposure is made as described in Example 1, and the exposed print element is reversal processed as described in Example 2 of U.S. Pat. No. 2,944,900.

Example 3

An autostereographic reflection print element is prepared as in Example 1 except that the multicolor photosensitive layers are replaced by a black-and-white gelatin photographic silver chlorobromide emulsion layer. The subject is photographed on a conventional black-and-white negative film in the same eight-lens camera described in Example 1. The exposed negative is processed conventionally and printed as described in Example 1. The print is processed conventionally and shows an excellent stereoscopic image when viewed by reflected light from the lenticular side.

Similar results are obtained with otehr radiation-sensitive layers including diazo, silver-dye salts, etc.

The invention has been described in detail with particular reference to preferred embodiments thereof, but it will be understood that variations and modifications can be effected within the spirit and scope of the invention.

We claim:

1. An autostereographic light-sensitive element comprising a transparent support having on one surface a multiplicity of lenticules, having on the opposite surface at least one light-sensitive layer and having a reflective layer coated over said light-sensitive layer farthest from said support, said reflective layer being permeable to aqueous alkaline solutions.

2. The element of claim 1 in which said light sensitive layer is a silver halide emulsion layer.

3. The element of claim 1 in which said opposite surface has thereon a multilayer color system.

4. The element of claim 1 in which the reflective layer comprises a hydrophilic colloid containing a reflective pigment.

5. The element of claim 4 in which the reflective pigment is titanium dioxide.

6. The element of claim 5 in which the colloid is gelatin.

7. The element of claim 1 in which the lenticular frequency is 150 to 300 per inch.

8. The element of claim 1 in which the transparent support is a cellulose ester.

9. The element of claim 8 in which the cellulose ester is cellulose triacetate.

10. An element of claim 1 in which said opposite surface has thereon a green-sensitive silver halide emulsion, a red-sensitive silver halide emulsion, and a blue-sensitive silver halide emulsion.

* * * * *